(12) United States Patent
Hengeveld (10) Patent No.: US 6,253,082 B1
(45) Date of Patent: Jun. 26, 2001

(54) METHOD FOR SELECTING AN ALTERNATE CHANNEL IN A WIRELESS COMMUNICATIONS SYSTEM

(75) Inventor: Thomas Hengeveld, Hollis, NH (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/245,752

(22) Filed: Feb. 8, 1999

Related U.S. Application Data
(60) Provisional application No. 60/094,613, filed on Jul. 30, 1998.

(51) Int. Cl.[7] .............................. H04Q 7/20; H04B 7/00
(52) U.S. Cl. ......................... 455/436; 455/437; 455/450; 455/509; 455/512
(58) Field of Search ..................................... 455/432, 434, 455/435, 436, 437, 438, 439, 443, 444, 450, 451, 452, 453, 509, 512, 515; 370/350, 330

(56) References Cited

U.S. PATENT DOCUMENTS

| | | | | |
|---|---|---|---|---|
| 5,203,015 | * | 4/1993 | George | 455/514 |
| 5,463,675 | * | 10/1995 | Gerszberg | 455/551 |
| 5,586,338 | * | 12/1996 | Lynch et al. | 455/433 |
| 5,844,906 | * | 12/1998 | Khelghatti et al. | 370/474 |
| 5,845,198 | * | 12/1998 | Bamburak et al. | 455/31.1 |
| 5,884,182 | * | 3/1999 | Hoover | 455/455 |
| 5,987,332 | * | 11/1999 | Gettleman et al. | 455/518 |
| 5,995,834 | * | 11/1999 | Moore | 455/434 |
| 5,999,811 | * | 12/1999 | Molne | 455/432 |
| 6,108,543 | * | 8/2000 | Takahashi et al. | 455/434 |

OTHER PUBLICATIONS

Radio Resource Management, Part 405, CDPD System Specification, Release 1.1, Jan. 19, 1995. pp. 405–1 to 405–30.

* cited by examiner

Primary Examiner—Nay Maung
Assistant Examiner—Ray Persino
(74) Attorney, Agent, or Firm—Synnestvedt & Lechner LLP (57) ABSTRACT

In a wireless communications system, upon making a decision to roam, the mobile chooses an alternate communications channel in a prioritized manner and evaluates the chosen channel for whether it is able to support a data link interconnection. Upon evaluating that a chosen channel is able to support a data link connection, the chosen channel is selected as the next best alternate channel on which to attempt a data link establishment procedure. The channels are chosen from a set of possible channels in an order including a home channel, an in area channel, and then any of the possible channels. Advantageously, the selection of the next best alternate channel provides increased probability of establishing and maintaining a data link over the selected channel as well as providing a certain amount of control communications traffic flow in the system.

33 Claims, 8 Drawing Sheets

METHOD FOR SELECTING AN ALTERNATE CHANNEL IN A WIRELESS COMMUNICATIONS SYSTEM

RELATED APPLICATION

The present application claims the benefit of priority based on U.S. Provisional Application No. 60/094,613 filed on Jul., 30, 1998.

BACKGROUND

Known mobile communications systems comprise a base station ("the base") that communicates with one or more mobile end systems ("the mobile") over a wireless communications link. There are typically a number of bases logically interconnected by a local area network serviced by a serving terminal in a central office. The serving terminal acts as a router and the base to central office. Communication occurs via a land line or satellite link. As in the phone system, the central office performs a switching and directing function, for further transmission of voice and/or data to a destination communication device. The wireless communications link between the mobile and the base typically operates over a radio frequency ("RF") channel in an appropriate communication band using any one of a number of known modulation techniques.

Under conventional roaming techniques, as an established wireless communications link degrades through movement of the mobile about a geographic area, either the mobile or the base makes a decision that the mobile will roam, i.e., attempt to establish communication over another channel in anticipation of an improved communication link. The mobile then attempts to establish another communication link to replace the degraded link. The mobile attempts to establish communication on a new RF channel either with the same base or with a new base. Conventionally, the decision to roam is based on a measurable degradation of the RF signal between the base and the mobile. Decisions may be based on one or more criteria including, but not limited to, signal strength or noise figure of the signal as received by either the base or the mobile. In voice and data systems, a decision to roam may also be based on data transmission criteria such as bit error rate, transmission success rate, or channel utilization. As one of ordinary skill in the art can appreciate, the conventional roaming criteria, therefore, are typically based upon the quality or status of the RF channel between the mobile and the base and the ability to transmit information over the physical medium.

There is a failure mode in a communications link, however, that can occur in the presence of a high quality physical communications link between the base and the mobile. The communications link between the base and a serving terminal or central office can fail, and like links in a chain, when one link is broken, so that the entire chain and communication degrades or ceases altogether. In this failure mode, the mobile does not attempt to find a new and operable channel because the RF communication between the mobile and the base is functioning properly and the thresholds of the roaming criteria are not surpassed even though information transfer cannot be completed. Consequently, neither the mobile nor the base determines that roaming is necessary or advantageous. The mobile remains in a static state of non-communication in contravention of the objective of the overall communications system.

There is a need, therefore, for an improved method of maintaining a communication link in a wireless communication system to ensure information transfer during a communications session with a mobile in a wireless communications system.

SUMMARY OF THE INVENTION

It is an objective of an embodiment according to the teachings of the present invention to improve a mobile communications link.

It is another objective of an embodiment according to the teachings of the present invention to maintain a more constant communication link between any one mobile and a base over time and geographic position of the mobile.

A method of selecting a second channel between a mobile and a host in a wireless communications system when a first established data link connection over a first channel degrades comprises the steps of choosing a channel from a set of potentially useful channels and attempting to obtain synchronization over the chosen channel, The method further comprises the steps of marking the chosen channel as useless if synchronization is not achieved and repeating the process beginning at the step of choosing the channel. The method further comprises the steps of selecting the chosen channel if synchronization is achieved, and establishing a data link connection over the selected channel if synchronization is achieved.

It is an advantage of an embodiment according to the teachings of the present invention that a potential failure mode in a wireless communication system is detected and accommodated.

It is an advantage of an embodiment according to the teachings of the present invention that an alternate communication channel may be established in the event of a temporary failure on an existing communication channel.

It is another advantage of an embodiment according to the teachings of the present invention that a wireless communications system makes efficient use of available channel distribution.

BRIEF DESCRIPTION OF THE DRAWINGS

Embodiments of the invention will now be described as a way of example with reference to the accompanying drawings in which.

DETAILED DESCRIPTION THE PREFERRED EMBODIMENTS

Figure 1:
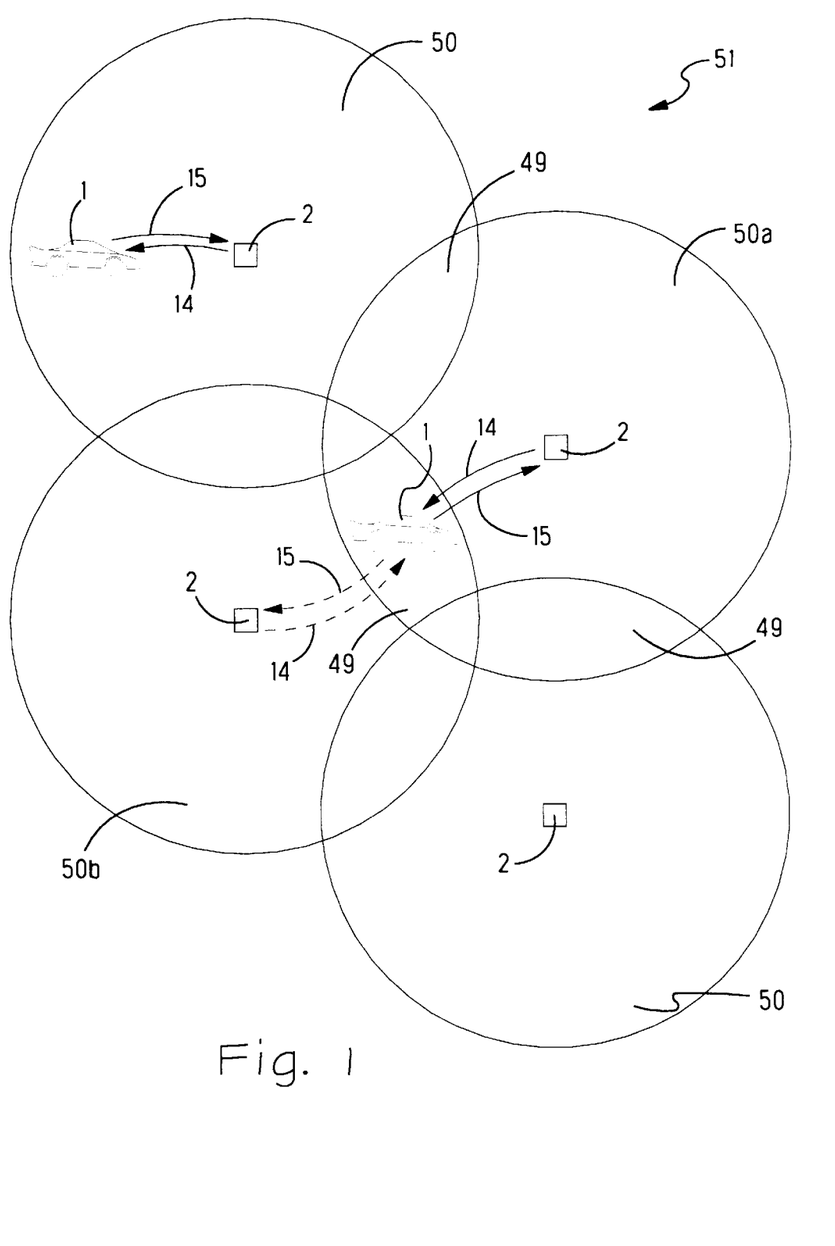
FIG. 1 is a conceptual representation of a wireless communications system illustrating established communications links in solid lines and an available alternate communication link in dotted line.
Figure 2:
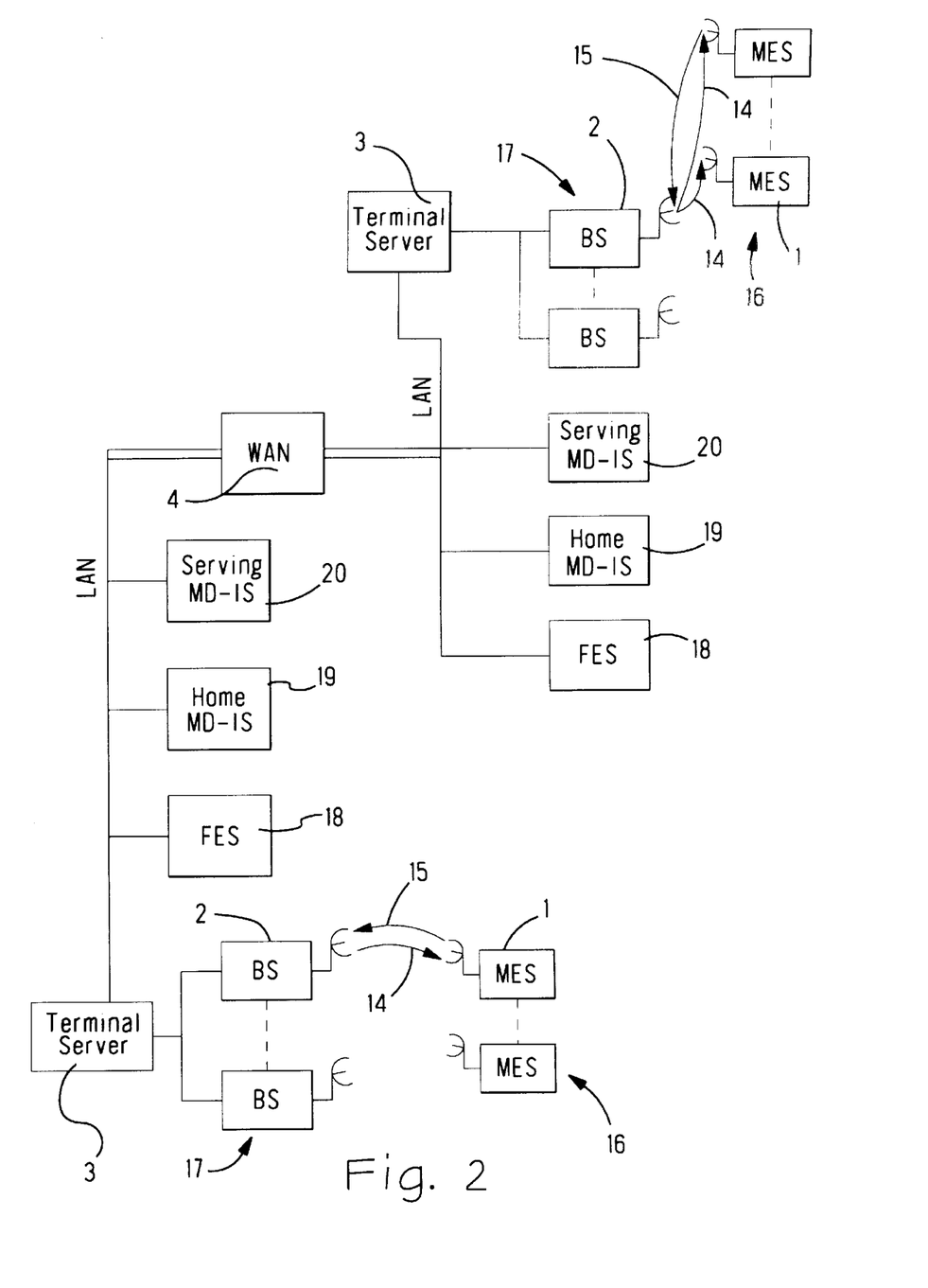
FIG. 2 is a block representation of an embodiment of a communications system according to the teachings of the present invention.

In an embodiment of a wireless mobile communications system according to the teachings of the present invention and with specific reference to FIGS. 1 and 2 of the drawings, a base station ("base") 2 communicates with a plurality of mobile end systems ("mobiles") 1 in a cell 50. Wireless communication within the cell 50 is over one or more radio frequency ("RF") channels. In a specific embodiment according to the teachings of the present invention, the RF channels are in a Special Mobile Radio ("SMR") frequency band. Each base 2 uses a plurality of RF channels which is a unique subset of the channels that make up the SMR band. A cell 50 is defined as the geographic reach within which mobiles 1 may travel and still communicate with a single defined base station 2 over the RF channels associated with the defined base 2. In a wireless communications system, a grouping of adjacent ones of the cells 50 define a communications area 51. The cells 50 typically overlap, as shown by reference numeral 49, to improve overall coverage. Accordingly, cells 50, having geographically overlapping areas of coverage, do not use the same RF channels, and at any geographic position, one channel can communicate with only one of the bases 2. The base 2 and each mobile 1 located within the cell 50 communicate with each other over a single channel pair in a plurality of predetermined possible channel pairs in the SMR frequency band. Each base 2 simultaneously communicates with a plurality of the mobiles 1 over a plurality of the channel pairs in full duplex operation. Each mobile 1 communicates with the base 2 over one of the channel pairs in either full or half duplex operation. Each channel pair has a forward channel 14, base 2 to mobile 1, and a reverse channel 15, mobile 1 to base 2. The forward and reverse channels 14,15 are logically related to each other by being separated in the frequency domain by a fixed frequency differential. The forward channel 14 is a contentionless broadcast channel which is received and decoded by all mobiles 1 tuned to the channel 14. All mobiles 1 tuned to one of the reverse channels 15 share it. Communication over the reverse channel 15 is arbitrated. Accordingly, only one mobile 1 may transmit to the base 2 on each reverse channel 15 at any one point in time. When more than one mobile 1 attempts to transmit a data packet at the same time, a collision occurs, and the data packet is lost.

Each mobile 2 is provisioned with a list of possible channel pairs in the frequency band that the mobile 1 can use to maintain communication with a number of bases 2 as it moves geographically between the cells 50. A typical method for provisioning the mobile 1 with the set of possible channels pairs comprises manually or electronically presetting the parameters of the possible channel pairs prior to deployment of the mobile 1. The list of the possible channels for any one mobile 1 is a subset of the set comprising all channels in the band and is logically predetermined to permit the mobile 1 to move freely among the cells 50 in the area 51. The list of possible channels is, therefore, logically related to the specific application and network infrastructure in place in the area 51 in which the mobile 1 is intended to operate. It is also possible, that a single cell 50 defines the area 51. As one of ordinary skill can appreciate, however, the specific radio frequency ("RF") and contention parameters of the communication are irrelevant to the claimed invention.

In the disclosed embodiment of a communication system, both voice and data are transferred between the mobiles 1 and the bases 2. The information transfer method for voice is different from the information transfer method for data. The remaining description is limited to describing information transfer for data. To the extent that voice information is digitized, the voice information behaves as data and the following description applies.

The mobiles 1 do not communicate directly with each other. All communication comprises information packets that travel through the base 2 to which the mobile 1 has an established communication link 14, 15. The base 2 forwards an information packet onto a local area network ("LAN") 4 where the information is routed to its intended destination. With specific reference to FIG. 2 of the drawings, there is shown a block diagram of the mobile 1 on a user side 16 communicating with a host 18 on a network side 17 over a wireless communications link 14,15. Central to the communication is a routing function performed by a home mobile data intermediate system ("MD-IS") 19 and a serving MD-IS 20. Conceptually, the home MD-IS 19 keeps track of the current logical location of each mobile 1 to which it is assigned as "home". The serving MD-IS 20 keeps track of the mobiles 1 currently located in its serving area which may be one of the mobiles 1 in its home area or one of the mobiles 1 not in its home area that has roamed to a different area termed the "serving"area.

In a typical outbound communication, the host 18 or fixed end system ("FES") has a packet of information to transmit to a destination mobile 1. The host 18 originates an outbound packet of information intended for the destination mobile 1 and sends the outbound packet together with a unique address of the destination mobile 1 over a local area network 4 to the home MD-IS 19. The unique address is a conventional Internet Protocol ("IP") address. The home MD-IS 19 keeps a record of the serving MD-IS 20 that is currently associated with the destination mobile 1. The home MD-IS 19 forwards the information packet to the serving MD-IS 20 which routes the packet to the terminal server 3 and the base 2 serving the destination mobile 1 which in turn forwards the information packet to the destination mobile 1. In a typical inbound communication, one of the mobiles 1 has a packet of information to transmit to a fixed end system 18. The mobile 1 originates an inbound packet of information together with a unique IP address of the destination FES 18 for communication over the reverse channel 15 to the base 2 to which it has an established communication link. The base 2 then transfers the information packet to the terminal server 3 which transfers the data to the serving MD-IS 20. The serving MD-IS 20 then routes the information packet to its intended destination FES 18. As one of ordinary skill in the art can appreciate, multiple LANs 4 may be interconnected over a wide area network ("WAN") in which mobile to host communication is conceptually similar except for the WAN hop. WAN routing operates according to conventional techniques using conventional IP addressing.

Figure 3:
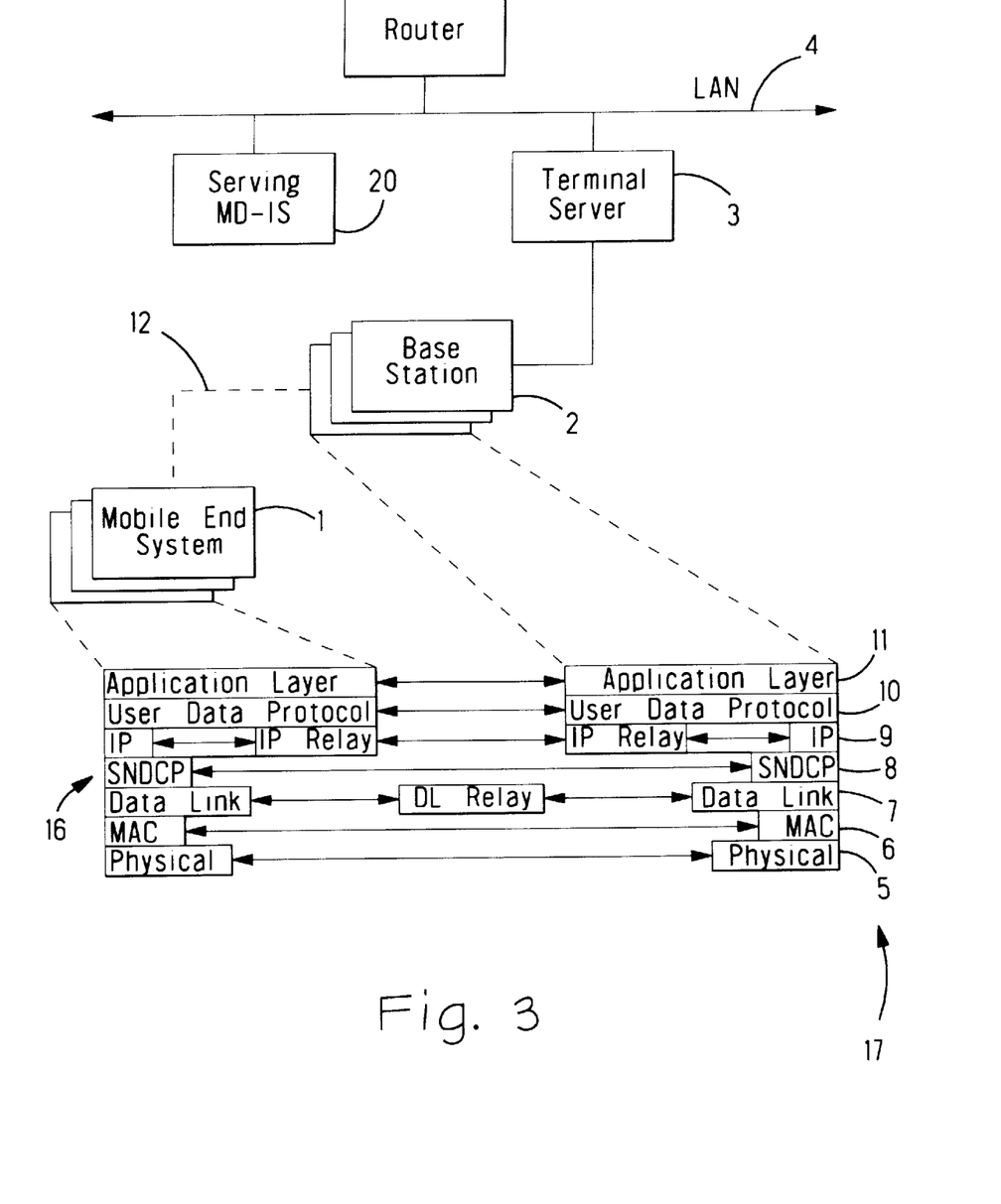
FIG. 3 is a block representation of a plurality of bases and mobiles and their logical representation to functional layers of the communications system.

With specific reference to FIG. 3 of the drawings, the functions of the communication system can be represented as seven logically interconnected layers of function including;

a physical layer 5, a medium access control layer (MAC) 6, a data link layer 7, a subnetwork dependent control protocol (SNDCP) layer 8, an internet protocol (IP) layer 9, a user data protocol layer 10, and an application layer 11.

Each functional layer is resident in both the mobile 1 and the base 2 to perform functions appropriate for each device to complete and present information. The term "layer" refers to the function performed and may be implemented in hardware or software or a combination as appropriate under the circumstances. A wireless link 12 between the mobile 1 and the base 2 is implemented by respective physical layers 5 and MAC layers 6 in the mobile 1 and the base 2. Specifically, in the mobile 1, the physical layer 5 tunes to one of the available RF channels. The physical layer 5 accepts a sequence of bits from the MAC layer 6 resident in the mobile 1 and transforms those bits into an appropriate modulated waveform for transmission over the currently established RF channel. The physical layer 5 resident in the mobile 1 communicates to the physical layer 5 resident in the base 2. The physical layer 5 in the base 2 is also tuned to the same RF channel and receives the transmitted modulated waveform, demodulates it and converts it to a series of bits for delivery to the base station MAC layer 6. Many requirements for cellular operation of the physical layer 5 are defined in EIA standards EIA/IS-19, EIA/IS-20, EIA/TIA-54, EIA/TIA-55, EIA/TIA-56 and EIA/TIA-553 the contents of which are hereby incorporated by reference. The MAC layer 6 arbitrates access to the physical layer 5 for the reverse channel 15 operation and encapsulates data for delivery to the data link layer 7. Concepts and principles of the data link layer 7 are described in CCITT-X.200, CCITT-X,210, ISO-7809, ISO-4335, ISO880202, ISO 10039, CCITT-Q.920, CCITT-Q.921, and CCITT-V.42 the contents of which are specifically incorporated by reference herein.

Figure 4:
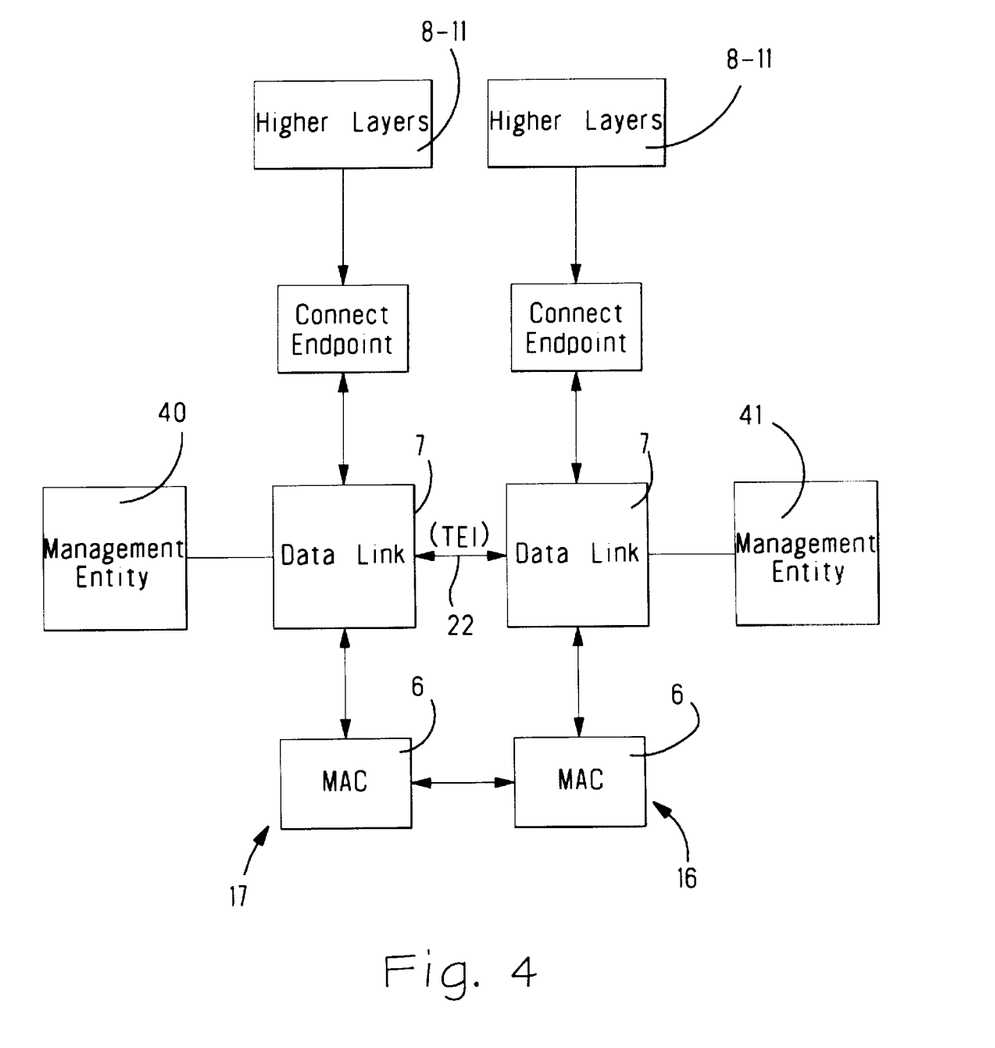
FIG. 4 is a graphical representation of peer to peer communication of the relevant functional layers as shown in FIG. 3 of the drawings.

With specific reference to FIG. 4 of the drawings, there is shown a block diagram of the MAC layers 6 and data link layers 7 for a user side 16 and a network side 17 of the communications system. A MAC layer 6 peer to peer interconnection 21 is a connectionless protocol. The MAC layers 6 perform a media arbitration function that permits two or more of the mobiles 1 to share a common transmission medium over the reverse channel 15. The MAC layers 6 have provision for collision avoidance, detection, and recovery and for making roaming decisions based upon measured frame transmission characteristics. A data link 7 peer to peer interconnection 22 is a connection-based protocol. For point to point communication, a data link 7 peer to peer connection 22 is created upon assignment by the system of a unique temporary equipment identifier ("TEI") value associated with the connection 22. Conceptually, TEI administration procedures are performed by a network side management entity 40 and a user side management entity 41. The TEI value is maintained and used in data link layer intercommunication between the network and a single mobile 1 until loss of a TEI assignment. Accordingly, even if the physical and MAC layer interconnection 21 is operational, without a TEI value, information transfer from the mobile 1 on the user side 16 to the network side 17 at higher functional layers of the communications system does not occur. In the disclosed embodiment, for point to point communication, TEI values between 16 and $(2^{27}-1)$ are acceptable. For broadcast communication, the network side data link layer 7 uses a TEI value of 1.

Figure 5:
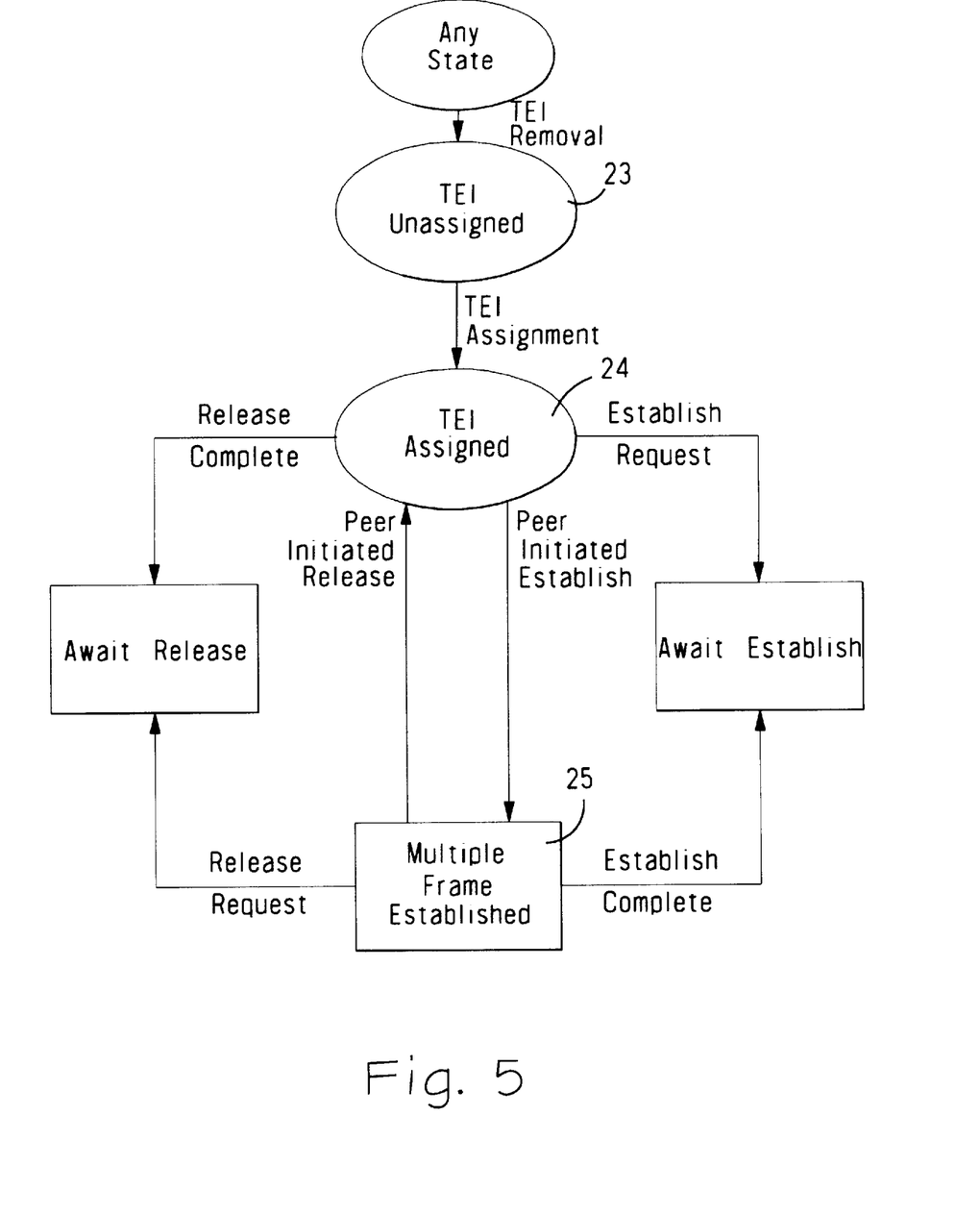
FIG. 5 is a state diagram representation of states and transitions between states of a system according to the teachings of the present invention.

With specific reference to FIG. 5 of the drawings, there is shown a state diagram of the respective data link layers 7 for point to point communication procedures between the user side 16 and the network side 17 of the communication system. The procedures described herein are similar to those described in CDPD System Specification Release 1.1, dated Jan. 19, 1995, the contents of which are specifically incorporated by reference herein. The data link layer 7 in the mobile 1, in a TEI unassigned state 23, sends a TEI request to the peer layer 7 in the network side 17 to assign a TEI value. Prior to sending the request 42, the user side management entity 41 builds a TEI request message including the following data link layer transmission parameters;

a TEI value of 0 indicating a TEI unassigned state, a unique equipment identifier ("EID") of the mobile 1 requesting the TEI assignment, a mobile data link protocol version code, a transmit window size, a receive window size, a mobile retransmission timer in increments of 0.1 seconds, a mobile maximum retransmission counter value, an idle timer maximum value in increments of 0.1 seconds, a V.42 bis Data Compression request, a V.42 bis number of codewords, and a V.42 bis maximum string length.

Upon initiation of the TEI request, a request timer is started and the retransmission counter is set to 1.

Figure 6:
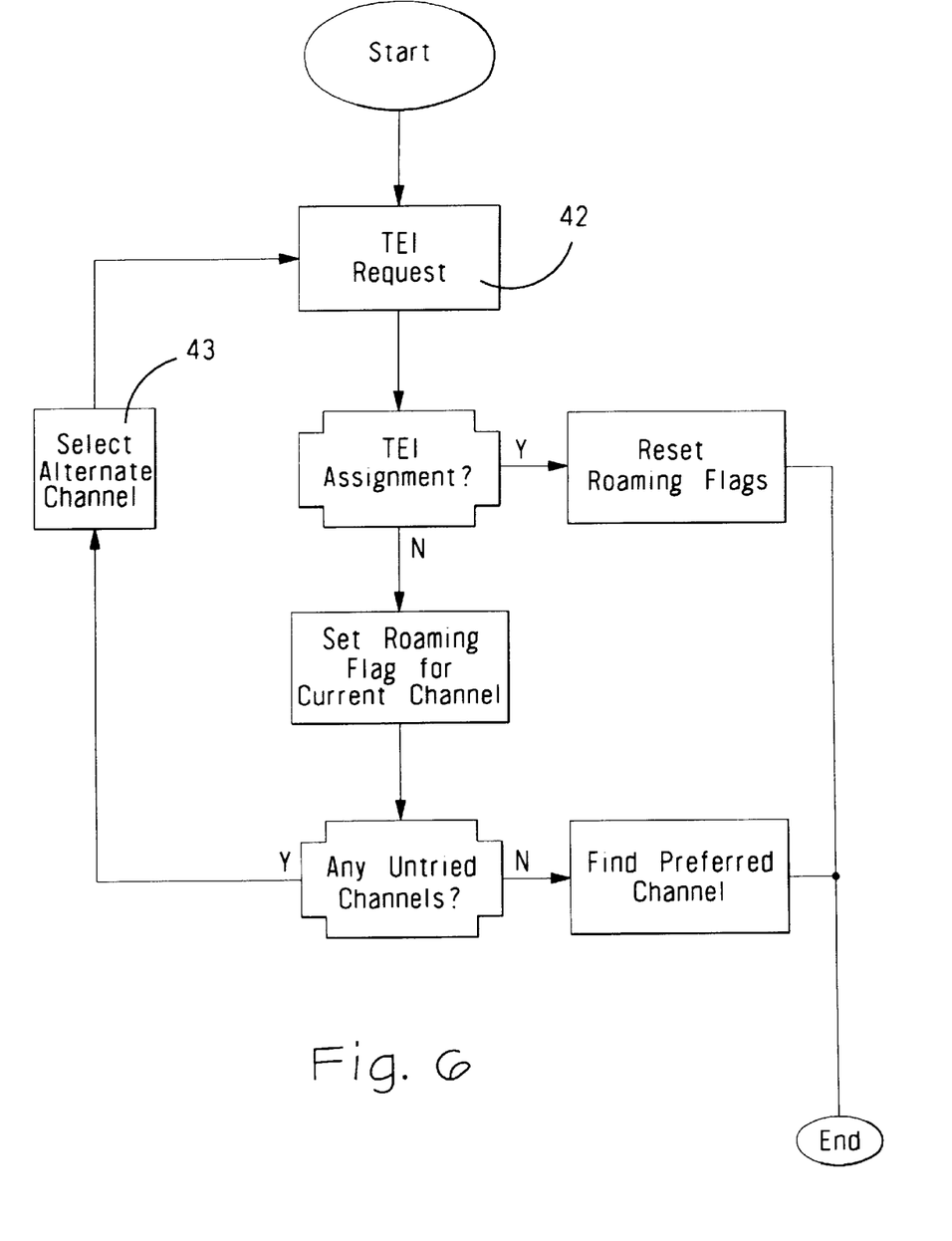
FIG. 6 is a graphical representation of a method according to the teachings of the present invention for making a decision to change a communication channel.

In response to the TEI request, the network side management entity 40 first identifies whether there is an existing TEI value currently assigned to the specified EID. This will happen when the mobile 1 has an established connection with an assigned TEI value in a first cell 50*a* and roams to a second cell 50*b* and wishes to establish a new connection in the second cell 50*b* without formally breaking the established connection with the first cell 50*a*. Under those circumstances, the network side 17 management entity 40 detects the condition and removes the TEI, breaking the former data link connection with the mobile 1, before performing procedures to establish a new data link connection. The network side management entity 40 identifies whether the TEI request message is the expected size and determines if the mobile data link version protocol parameter in the TEI request is consistent with the data link layer's version number. If not, the TEI request is discarded and a TEI is not assigned. If so, the network side management entity 40 builds a TEI assign message and places the EID of the requesting mobile, the network side data link layer version number and supportable data link layer parameters in the response TEI assign message. The network side management entity 40 selects a unique TEI value from a plurality of available values and sends the TEI assign message to its peer layer in the mobile 1 that originated the TEI request 42. The mobile 1 discards the TEI assign message if the EID parameter is not its own, the TEI assign message is an unexpected size, or the TEI value is not properly encoded and in the appropriate range. If the TEI assign message is acceptable, the user side management entity 41 determines if the data link layer parameters in the TEI assign message are acceptable. If so, the user side management entity 41 informs the user side data link layer 7, and the user side data link layer 7 enters a TEI assigned state 24. When the user and network side data link layers 7 have successfully entered the TEI assigned state 24, they complete the data link connection 22 and enter a multiple frame established state 25 rendering the data link layer connection 22 defined and operational. If not, the TEI is not used, and the TEI assignment has failed. Upon expiration of the request timer, the mobile 1 becomes aware of failure of the TEI request 42. FIG. 6 of the drawings shows a flow diagram of data link layer roaming that occurs when the physical and MAC layers 5,6 are operational and the TEI assignment procedures on a current channel have failed. The user side data link layer 7 is in the TEI unassigned state 23.

Figure 8:
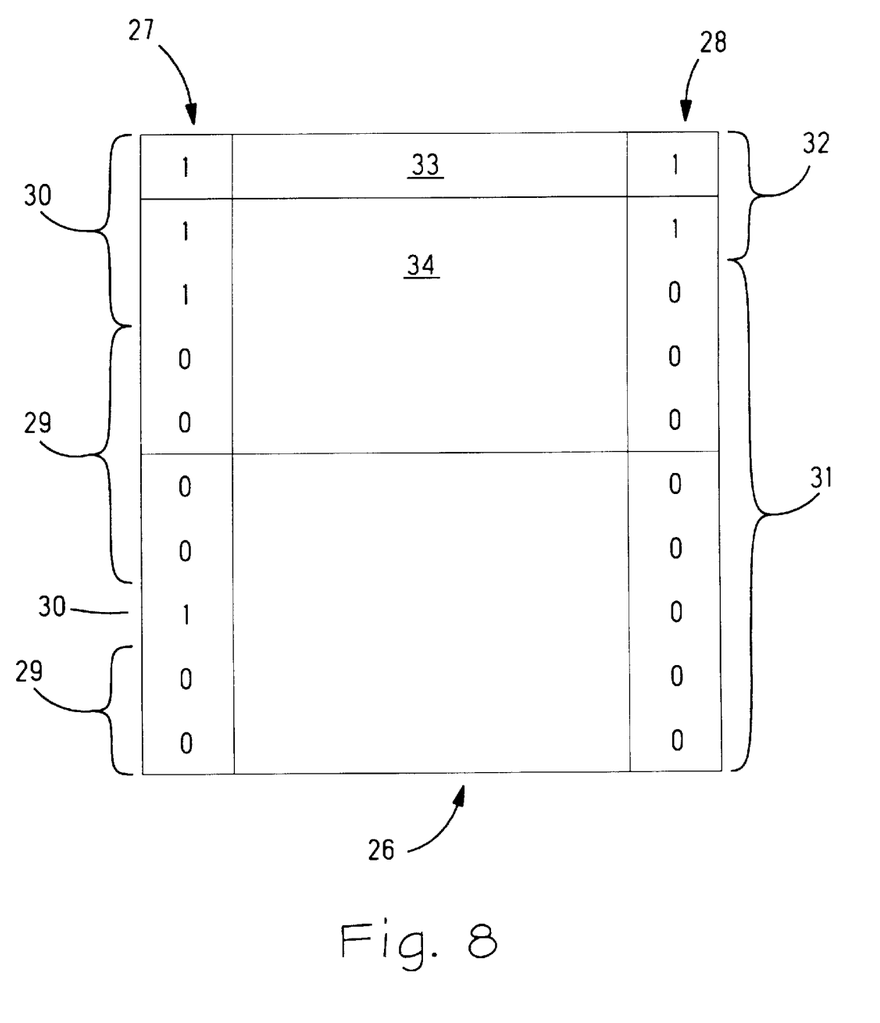
FIG. 8 is a conceptual illustration of a channel list according to the teachings of the present invention.

FIG. 8 is a conceptual illustration of a channel list according to one embodiment of the present invention. Referring to FIGS. 6 and 8, each mobile 1 is provisioned with a set of possible channels 26 it can use for information transfer. The set of possible channels 26 defines the roaming area 51 for the mobile 1. Each possible channel 26 has a roaming marker which in the disclosed embodiment comprises a roaming flag bit 27 associated with it. If a current TEI request 42 has failed, the mobile 1 makes further attempts to acquire the TEI on the same channel by reissuing the TEI request 42 a predetermined number of times, for example three tries. The number of retries is a system programmable variable and is application dependant. Reasons for failure of the TEI request 42 include expiration of the request timer without receipt of a response TEI assign message, the TEI assign message is unacceptable, or parameters in the received TEI assign message are unacceptable. If all retries fail, the user side management entity 41 sets the roaming flag 27 for the current channel on which the TEI assignment request 42 has failed to mark it as a tried channel 30. Those in one embodiment, those channels having an associated roaming flag 27 equal to a reset value, for example zero (0), are "untried" channels 29. Those channels having the associated roaming flag 27 equal to a set value, for example one (1), are "tried" channels 30. The user side management entity 41 then determines from the list of possible channels 26, whether any remaining channels are untried channels 29. If so, the user side management entity 41 makes a decision to roam 43. The select alternate channel 43 process selects one of the untried channels 29 for the next TEI request 42 and the system repeats the TEI procedure (as shown in FIG. 6) for the untried channel 29 selected. Upon a successful TEI assignment, the user side management entity 41 resets all of the roaming flags 27, the user side and network side peer data link layers 7 enter the TEI assigned state 24, and the peer to peer data link layer 7 connection is established.

Figure 7:
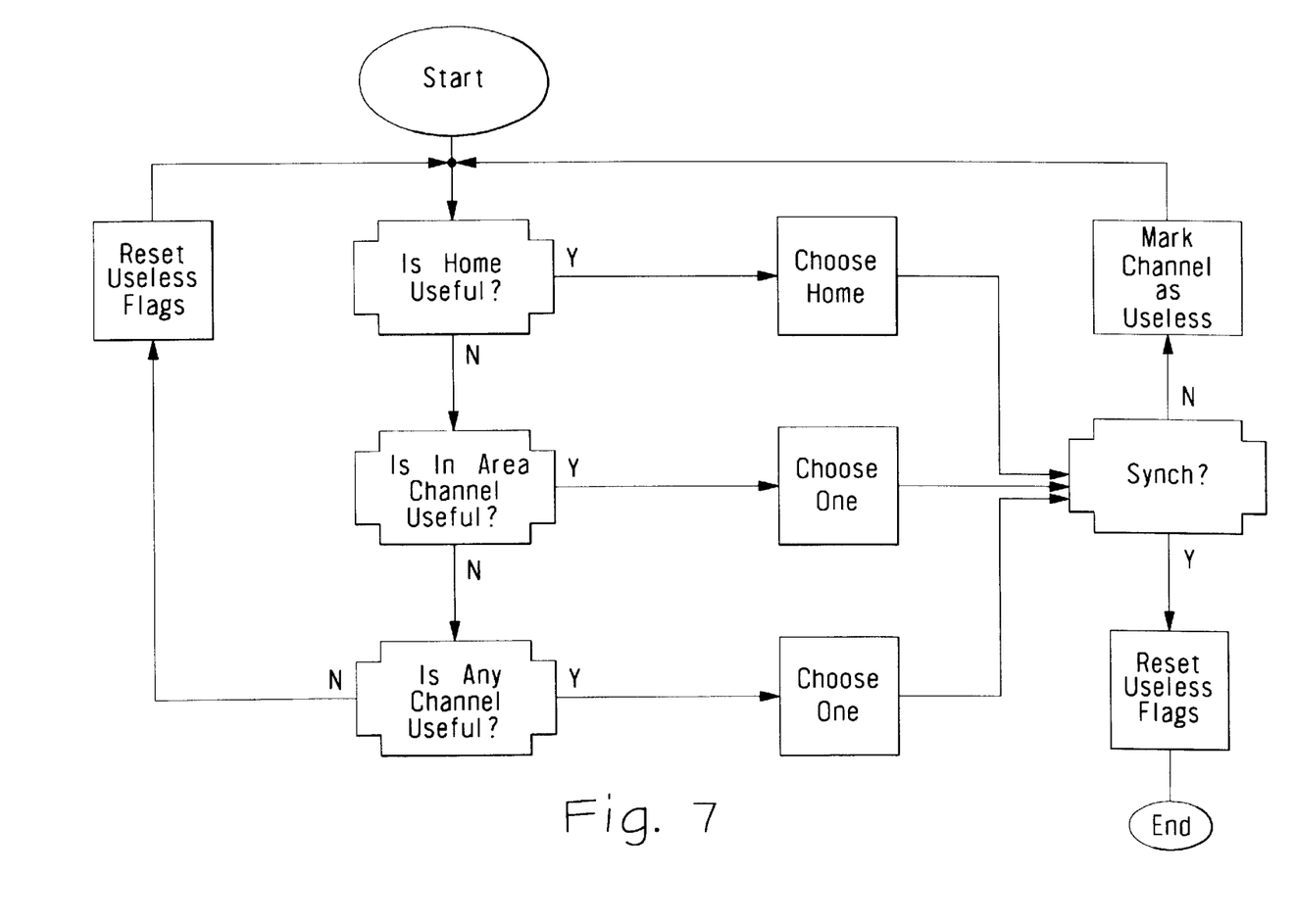
FIG. 7 is a further detailed representation of a portion of the method shown in FIG. 6 of the drawings.

With specific reference to FIG. 7 of the drawings, a flow diagram of the roam channel selection process 43 (FIG. 6) which identifies a next best channel on which to issue the TEI request is shown. The roam channel selection process 43 represents overhead for a mobile communications system during which the mobile 1 is not communicating with the base 2. It is, therefore, efficient and advantageous to minimize the time between loss of a first communications link on a first channel and establishment of a second communications link on a second channel. Selection of an alternate channel is prioritized in an order of those channels most likely to support a robust communications link for the longest amount of time. The alternate channel selection process 43 evaluates the possible channels 26 in a prioritized order based on the current ability of the mobile 1 to achieve MAC layer synchronization with one of the bases 2 over the selected channel. An ability to obtain MAC layer synchronization on the evaluated channel signifies that the channel has currently operational physical and MAC layers 5,6 which are able to support a MAC layer peer to peer connection 21. This further indicates the potential ability of the evaluated channel to support a data link connection 22 and the channel is, therefore, useful. An inability to obtain MAC layer synchronization signifies that the evaluated channel is not able to support a peer to peer data link connection 22 and is, therefore, useless. Determination of the inability of the channel to obtain MAC layer synchronization, therefore, obviates the need to issue the TEI request 42 because in the absence of MAC layer synchronization, the TEI request will fail. The process for evaluating the utility of the channel takes less time than the TEI administration process. Accordingly, the time for the alternate channel selection process 43 to execute is minimized through evaluation of the MAC layer synchronization before attempting establishment of the data link connection 22. As a result, the mobile 1 experiences shorter interruptions in communication as the mobile 1 roams between cells 50.

Referring to FIGS. 7 and 8, when the mobile 1 makes the decision to select an alternate channel on which to attempt to establish a TEI, all of the possible channels 26 are presumed to also be useful channels 31. That is to say that at the beginning of the select alternate channel process 43, all of the possible channels 26 except for the channel on which a most recent TEI request failed can also potentially support the data link connection 22. A useful channel 31 is defined as an RF channel on which the roaming mobile 1 can obtain MAC layer synchronization with the respective MAC layer 6 in the base 2. If the synchronization on the evaluated channel is not possible, it signifies that the physical layer 5 is not able to support a communications link. It is, therefore, unnecessary to attempt the TEI request, In the absence of an ability to obtain MAC layer synchronization, therefore, the evaluated channel is defined as a useless channel 32 and the mobile 1 is presumed to be out of range of the associated base 2 on the useless channel 32. Accordingly, when the mobile 1 makes a decision to select the alternate channel, the useless flag 28 associated with the current channel is set e.g., to 1. The mobile 1 is provisioned with a predetermined home channel 33. The mobile 1 also keeps track of the current area. The current area is defined as the set of bases 2 and the channels associated with the set of bases 2 to which the most recent data link connection 22 was established with a TEI assigned value. Based upon the knowledge of the current area, the mobile 1 identifies at least one home channel 33 and typically a set of in area channels 34 among the set of the possible channels 26. As a practical matter, selection of the home channel 33 is application dependent. For example, in a mobile communications system, certain ones of the mobiles 1 are expected to remain within the confines of a certain geographic area serviced by a single base 2 most of the time. Accordingly, the home channel 33 is selected as that channel and base of which the mobile 1 is expected to be within range for a majority of the mobile's operational existence and represents a primarily preferred channel. The in area channels 34 are secondarily preferred channels of which the mobile 1 is expected to be within range based upon the known recent history of the mobile's most recent rough geographic position. The remaining possible channels 26 are for use as tertiary channels if and when the home and in area channels 33,34 are not available. The disclosed alternate process channel selection 43 cannot support a MAC layer or data link interconnection 21,22 and therefore, provides a certain amount of control over communication traffic distribution in the wireless communications system and maximizes the probability of establishing the data link connection 22.

The alternate channel selection process 43 relies on prior information identifying those ones of the possible channels 26 that are also the tried channels 30. The alternate channel selection process 43 first determines whether the home channel 33 is both one in a set of potentially useful channels 31 and one of the untried channels 29, e.g., by using the AND operator for a utility flag 28 and the roaming flag 27 associated with the home channel 33. In the disclosed embodiment, the utility flag 28 having a value of 1 indicates a useless channel 32. Accordingly, the utility flag 28 may also be termed a "useless flag". If the determination indicates that the home channel 33 is one of the useful channels and is an untried channel, the home channel 33 is chosen and evaluated for its ability to obtain MAC layer 6 synchronization. If MAC layer 6 synchronization is possible, the useless flags 28 for all possible channels 26 are reset (e.g., to 0) and the home channel 33 is selected for the next TEI request 42. If synchronization on the home channel 33 is not possible, the useless flag 28 for the home channel 33 is set, e.g., to 1. If the home channel 33 is not one of the potentially useful channels 31, the alternate channel selection process 43 determines whether any one of the plurality of in area channels 34 is a potentially useful channel and an untried channel. If so, then that channel is chosen and evaluated for whether it is possible to obtain MAC layer 6 synchronization. If synchronization is not possible, the useless flag 28 of the chosen channel is set and the alternate channel selection process 43 iterates. If synchronization is possible, the useless flags 28 for the possible channels 26 are reset and the chosen in area channel is used for the next TEI request 42. If the home channel 33 and all of the in area channels 34 are useless or have been tried, the select alternate channel 43 process determines whether any of the remaining possible channels 26 is both potentially useful and untried. If so, then that channel 26 is chosen and evaluated for whether it is possible to obtain MAC layer 6 synchronization. If synchronization is not possible, the useless flag 28 of the selected channel is set and the alternate channel process 43 iterates. If synchronization is possible, the useless flags 28 of all of the possible channels 26 are reset and the chosen and evaluated channel is selected for use in the next TEI request 42. In a communications system that only transfers data, if all of the possible channels 26 are useless channels or tried channels, all of the useless flags 28 are reset and the process iterates until synchronization can be obtained. As a practical matter, therefore, the mobile 1 remains in a non-communicating state until it can obtain synchronization on one of the possible channels 26. In a communications system that can transmit only data, if all of the possible channels 26 are useless channels or tried channels, the home channel 33 or other predetermined channel is selected regardless of whether it is useless, tried, or unable to achieve MAC layer synchronization. In a communications system that can transmit both voice and data, if the data link connection 22 cannot be established, the system selects a preferred voice channel and transmits voice only for a predetermined period of time. After the predetermined period of time, the system restarts the TEI administration process in order to retry to establish the data link connection 22.

The preferred voice channel identification process 43 identifies a communication channel when the roaming methods implemented in a mobile communications system fail. The preferred voice channel identification process 43, therefore, can be used as an adjunct to many types of roaming including the roaming embodiment disclosed herein as well as roaming methods known in the prior art. The preferred voice channel identification process is the same as the alternate channel selection process 43 except that the possible channels 26 are not evaluated as to whether they are tried or untried channels 29,30. The alternate channel is chosen on a prioritized basis beginning with the home channel 33, the in area channels 34, and then the remaining possible channels and evaluated based solely upon the chosen channel's ability to obtain synchronization. The first chosen channel that is able to obtain MAC layer sychronization is selected for voice communication.

Other advantages of the invention are apparent from the detailed description by way of example, and from accompanying drawings and from the spirit and scope of the appended claims.

What is claimed is:

1. A method of maintaining a wireless communications link between a mobile and a host by selecting a second channel between the mobile and the host in a wireless communications system when a first established data link connection over a first channel degrades, the method of comprising the steps of:
    (a) choosing a channel from a set of potentially useful channels in the wireless communications system;
    (b) attempting to obtain MAC (Medium Access Control) layer synchronization over the chosen channel;
    (c) marking the chosen channel a useless if said synchronization is not achieved and repeating the process beginning at the step of choosing the channel;
    (d) selecting the chosen channel if said synchronization is achieved; and
    (e) establishing a data link connection over the selected channel if said synchronization is achieved.

2. A method of maintaining a wireless communications link between a mobile and a host as recited in claim 1 wherein the mobile performs the recited steps.

3. A method of maintaining a wireless communications link between a mobile and a host as recited in claim 1 wherein the set of potentially useful channels is a subset of a set of possible channels, and the method further comprises the step of resetting the set of potentially useful channels to include an entirety of the set of possible channels if said synchronization is achieved.

4. A method of maintaining a wireless communications link between a mobile and a host as recited in claim 3 wherein the step of choosing the channel from the set of potentially useful channels is prioritized wherein the prioritization comprises the steps of:
    (a) choosing a home channel first if the home channel is also one of the potentially useful channels,
    (b) choosing one of in area channels that is also one of the potentially useful channels if the home channel is not one of the potentially useful channels, and
    (c) choosing any one channel from the set of potentially useful channels if the home and the in area channels are not one of the useful channels.

5. A method of maintaining a wireless communications link between a mobile and a host as recited in claim 4 wherein at least one of the home channel and the in are channels are predetermined.

6. A method of maintaining a wireless communications link between a mobile and a host as recited in claim 4 wherein the in area channels are defined by logical relation to the first channel.

7. A method of maintaining a wireless communications link between a mobile and a host as recited in claim 1 wherein the set of potentially useful channels is a subset of a set of possible channels, and the method further comprises the steps of:
    (e) associating a utility flag with each channel in the set of possible channels;
    (f) setting the utility flag to mark the chosen channels as useless if said synchronization is not achieved; and
    (g) resetting the utility flag to mark the potentially useful channels.

8. A method of maintaining a wireless communications link between a mobile and a host as recited in claim 1, further comprising the step of;

associating a roaming flag with each channel in the set of possible channels, the roaming flag marking each channel as either tried or untried, wherein the step of choosing the channel further comprises choosing the channel from the set of potentially useful channels that are also untried channels.

9. A method of maintaining a wireless communications link between a mobile and a host as recited in claim 8 wherein the step of choosing the channel from the set of potentially useful channels is prioritized.

10. A method of maintaining a wireless communications link between a mobile and a host as recited in claim 9 wherein the prioritization comprises the steps of:
   (a) choosing a home channel first if the home channel is also one of the potentially useful channels,
   (b) choosing one of in area channels that is also one of the potentially useful channels if the home channel is not one of the potentially useful channel and
   (c) choosing any one channel from the set of potentially useful channels if the home and the in area channels are not one of the useful channels.

11. A method of maintaining a wireless communications link between a mobile and a host as recited in claim 10 wherein the home channel is predetermined.

12. A method of maintaining a wireless communications link between a mobile and a host as recited in claim 10 wherein the in area channels are predetermined.

13. A method of maintaining a wireless communications link between a mobile and a host as recited in claim 12 wherein the home channel is predetermined.

14. A method of maintaining a wireless communications link between a mobile and a host as recited in claim 10 wherein the in area channels are defined by logical relation to the first channel.

15. A method of maintaining a wireless communications link between a mobile and a host as recited in claim 1, wherein said step (b) attempts to obtain synchronization between a MAC layer of the host and a MAC layer of the mobile over the chosen channel.

16. A method of maintaining a wireless communications link between a mobile and a host as recited in claim 15, wherein said step (e) assigns a TEI (Temporary Equipment Identifier) value to be used by the mobile and the host during communications over the data link connection established in said step (e).

17. A method of maintaining a wireless communications link between a mobile and a host as recited in claim 16, wherein the wireless communications system is a wireless telephone communications system, and the host is a base station located in a cell of the wireless telephone communications systems.

18. A method of maintaining a wireless communications link between a mobile and a host by selecting a second channel between the mobile and the host in a wireless communications environment, the method comprising the steps of having a first established data link connection over a first channel, accepting a set of possible channels and selecting from the set of possible channels a second channel on which to establish a second data link connection, said selecting step comprising the steps of:
   (a) choosing a channel from a set of potentially useful channels in the wireless communications environment;
   (b) attempting to obtain MAC (Medium Access Control) layer synchronization over the chosen channel;
   (c) marking the chosen channel as useless if said synchronization is not achieved and repeating the process beginning at the step of choosing;
   (d) selecting the chosen channel if said synchronization is achieved; and
   (e) establishing the second data link connection over the selected channel.

19. A method of maintaining a wireless communications link between a mobile and a host as recited in claim 18 wherein the mobile performs the recited steps.

20. A method of maintaining a wireless communications link between a mobile and a host as recited in claim 18 wherein the set of potentially useful channels is a subset of a set of possible channels, and the method further comprises the step of resetting the set of potentially useful channels to include an entirety of the set of possible channels if said synchronization is achieved.

21. A method of maintaining a wireless communications link between a mobile and a host as recited in claim 20 wherein the step of choosing the channel from the set of potentially useful channels is prioritized wherein the prioritization comprises the steps of:
   (a) choosing a home channel first if the home channel is also one of the potentially useful channels,
   (b) choosing one of in area channels that is also one of the potentially useful channels if the home channel is not one of the potentially useful channels, and
   (c) choosing any one channel from the set of potentially useful channels if the home and the in area channels are not one of the useful channels.

22. A method of maintaining a wireless communications link between a mobile and a host as recited in claim 21 wherein at least one of the home channel and the in area channels are predetermined.

23. A method of maintaining a wireless communications link between a mobile and a host as recited in claim 21 wherein the in area channels are defined by logical relation to the first channel.

24. A method of maintaining a wireless communications link between a mobile and a host as recited in claim 18 wherein the set of potentially useful channels is a subset of a set of possible channels, and the method further comprises the steps of:
   (e) associating a utility flag with each channel in the set of possible channels;
   (f) setting the utility flag to mark the chosen channels as useless if said synchronization is not achieved; and
   (g) resetting the utility flag to mark the potentially useful channels.

25. A method of maintaining a wireless communications link between a mobile and a host as recited in claim 18, further comprising the steps of:
   associating a roaming flag with each channel in the set of possible channels, the roaming flag marking each channel as either tried or untried,
   wherein the step of choosing the channel further comprises choosing the channel from the set of potentially useful channels that are also untried channels.

26. A method of maintaining a wireless communications link between a mobile and a host as recited in claim 25 wherein the step of choosing the channel from the set of potentially useful channels is prioritized.

27. A method of maintaining a wireless communications link between a mobile and a host as recited in claim 26 wherein the prioritization comprises the steps of:
   (a) choosing a home channel first if the home channel is also one of the potentially useful channels,
   (b) choosing one of in area channels that is also one of the potentially useful channels if the home channel is not one of the potentially useful channels, and (c) choosing any one channel from the set of potentially useful channels if the home and the in area channels are not one of the useful channels.

28. A method of maintaining a wireless communications link between a mobile and a host as recited in claim 27 wherein at least one of the home channel and the in area channels are predetermined.

29. A method of maintaining a wireless communications link between a mobile and a host as recited in claim 27 wherein the in area channels are defined by logical relation to the first channel.

30. A method of maintaining a wireless communications link between a mobile and a host as recited in claim 18, wherein said step (b) attempts to obtain synchronization between a MAC layer of the host and a MAC layer of the mobile over the chosen channel.

31. A method of maintaining a wireless communications link between a mobile and a host as recited in claim 30, wherein said step (e) assigns a TEI (Temporary Equipment Identifier) value to be used by the mobile and the host during communications over the data link connection established in said step (e).

32. A method of maintaining a wireless communications link between a mobile and a host as recited in claim 31, wherein the wireless communications environment is a wireless telephone communications system, and the host is a base station located in a cell of the wireless telephone communications system.

33. A method of selecting a second channel between a mobile and a host in a wireless communications system when a first established data link connection over a first channel degrades, the method of comprising the steps of:

(a) choosing a channel from a set of potentially useful channels;

(b) attempting to obtain synchronization over the chosen channel;

(c) marking the chosen channel a useless if said synchronization is not achieved and repeating the process beginning at the step of choosing the channel;

(d) selecting the chosen channel if said synchronization is achieved; and (e) establishing a data link connection over the selected channel if said synchronization is achieved, wherein the step of choosing the channel includes the steps of, (a1) choosing a home channel first if the home channel is one of a set of potentially useful channels, (a2) choosing one in a set of one or more of in area channels that is also one of the potentially useful channels if the home channel is not one of the potentially useful channels, and (a3) choosing any one channel from the set of potentially useful channels if the home and the in area channels are not one of the useful channels, wherein the one or more in area channels are defined by logical relation to the first channel.

* * * * *